(12) United States Patent
Xu et al.

(10) Patent No.: US 10,203,837 B2
(45) Date of Patent: Feb. 12, 2019

(54) MULTI-DEPTH-INTERVAL REFOCUSING METHOD AND APPARATUS AND ELECTRONIC DEVICE

(71) Applicant: Huawei Technologies Co., Ltd., Shenzhen (CN)

(72) Inventors: Jing Xu, Shenzhen (CN); Aidong Zhang, Shenzhen (CN); Changqi Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 537 days.

(21) Appl. No.: 14/977,966

(22) Filed: Dec. 22, 2015

(65) Prior Publication Data

US 2016/0117077 A1 Apr. 28, 2016

Related U.S. Application Data

(63) Continuation of application No. PCT/CN2014/080053, filed on Jun. 17, 2014.

(30) Foreign Application Priority Data

Jul. 10, 2013 (CN) .......................... 2013 1 0288099

(51) Int. Cl.
*G06F 3/0481* (2013.01)
*H04N 13/128* (2018.01)
(Continued)

(52) U.S. Cl.
CPC ........ *G06F 3/04815* (2013.01); *G06F 3/0488* (2013.01); *G06F 3/04842* (2013.01);
(Continued)

(58) Field of Classification Search
CPC .................................................. G06F 3/04815
See application file for complete search history.

(56) References Cited

U.S. PATENT DOCUMENTS 7,623,726 B1 11/2009 Georgiev
7,961,970 B1 6/2011 Georgiev
(Continued)

FOREIGN PATENT DOCUMENTS

CN 102314683 A 1/2012
CN 103002218 A 3/2013
(Continued)

OTHER PUBLICATIONS

Foreign Communication From a Counterpart Application, European Application No. 14822408.2, European Office Action dated Nov. 14, 2017, 44 pages.
Machine Translation and Abstract of Japanese Publication No. JP2002262169, Sep. 13, 2002, 26 pages.
Machine Translation and Abstract of Japanese Publication No. JP2012173965, Sep. 10, 2012, 29 pages.
(Continued)

*Primary Examiner* — Jennifer N To
*Assistant Examiner* — Ashley M Fortino
(74) *Attorney, Agent, or Firm* — Conley Rose, P.C.

(57) ABSTRACT

A multi-depth-interval refocusing method, apparatus and electronic device are provided. The method includes displaying an image on a display device; acquiring user input, and determining, in the displayed image according to the user input, a refocus area including at least two discontinuous depth intervals, where each depth interval in the at least two discontinuous depth intervals is constituted by at least one depth plane, each depth plane contains at least one focus pixel, and depths of object points corresponding to focus pixels contained on a same depth plane are the same; performing refocusing processing on an image within the refocus area to display a refocused image on the display device, where the refocused image has a visually distinguishable definition difference relative to an area, except the refocus area, in the displayed image; and displaying the refocused image on the display device. Therefore, multi-depth-interval refocusing is implemented.

15 Claims, 8 Drawing Sheets

(51) Int. Cl.
    *G06F 3/0488*      (2013.01)
    *G06F 3/0484*      (2013.01)
    *G06T 11/60*      (2006.01)

(52) U.S. Cl.
    CPC ...... *G06F 3/04847* (2013.01); *G06F 3/04883* (2013.01); *G06T 11/60* (2013.01); *H04N 13/128* (2018.05); *G06F 2203/04808* (2013.01)

(56) References Cited

U.S. PATENT DOCUMENTS

| | | | |
|---|---|---|---|
| 8,203,640 B2 | 6/2012 | Kim et al. | |
| 2008/0131019 A1* | 6/2008 | Ng | G06T 5/50 382/255 |
| 2011/0273369 A1* | 11/2011 | Imai | G06T 15/20 345/158 |
| 2012/0120277 A1 | 5/2012 | Tsai | |
| 2013/0044256 A1 | 2/2013 | Hiasa et al. | |
| 2013/0070060 A1* | 3/2013 | Chatterjee | H04N 5/2258 348/47 |
| 2013/0070145 A1 | 3/2013 | Matsuyama et al. | |
| 2013/0077880 A1 | 3/2013 | Venkataraman et al. | |
| 2014/0223370 A1 | 8/2014 | Matsuo | |

FOREIGN PATENT DOCUMENTS

| | | |
|---|---|---|
| CN | 103024261 A | 4/2013 |
| JP | 2002262169 A | 9/2002 |
| JP | 2012098594 A | 5/2012 |
| JP | 2012173965 A | 9/2012 |
| JP | 2013054401 A | 3/2013 |
| JP | 2013068671 A | 4/2013 |
| JP | 2013088579 A | 5/2013 |
| WO | 2013031281 A1 | 3/2013 |

OTHER PUBLICATIONS

Foreign Communication From a Counterpart Application, Chinese Application No. 201310288099.5, Chinese Office Action dated Feb. 27, 2017, 8 pages.
Foreign Communication From a Counterpart Application, Japanese Application No. 2016-524663, Japanese Notice of Rejection dated Mar. 14, 2017, 3 pages.
Foreign Communication From a Counterpart Application, Japanese Application No. 2016-524663, English Translation of Japanese Notice of Rejection dated Mar. 14, 2017, 3 pages.
Foreign Communication From a Counterpart Application, European Application No. 14822408.2, Extended European Search Report dated May 30, 2016, 10 pages.
Foreign Communication From a Counterpart Application, PCT Application No. PCT/CN2014/080053, English Translation of International Search Report dated Sep. 19, 2014, 2 pages.
Foreign Communication From a Counterpart Application, PCT Application No. PCT/CN2014/080053, English Translation of International Search Report dated Sep. 19, 2014, 13 pages.
Partial English Translation and Abstract of Japanese Patent Application No. JPA2012-098594, Nov. 30, 2016, 43 pages.
Partial English Translation and Abstract of Japanese Patent Application No. JPA2013054401, Nov. 30, 2016, 67 pages.
Partial English Translation and Abstract of Japanese Patent Application No. JPA2013068671, Nov. 30, 2016, 34 pages.
Partial English Translation and Abstract of Japanese Patent Application No. JPA2013088579, Nov. 30, 2016, 52 pages.
Foreign Communication From a Counterpart Application, Japanese Application No. 2016-524663, Japanese Office Action dated Oct. 4, 2016, 4 pages.
Foreign Communication From a Counterpart Application, Japanese Application No. 2016-524663, English Translation of Japanese Office Action dated Oct. 4, 2016, 4 pages.

* cited by examiner

MULTI-DEPTH-INTERVAL REFOCUSING METHOD AND APPARATUS AND ELECTRONIC DEVICE

CROSS-REFERENCE TO RELATED APPLICATION

This application is a continuation of International Application No. PCT/CN2014/080053, filed on Jun. 17, 2014, which claims priority to Chinese Patent Application No. 201310288099.5, filed on Jul. 10, 2013, both of which are hereby incorporated by reference in their entireties.

TECHNICAL FIELD

The present disclosure relates to technologies of human-computer interaction and image processing, and in particular, to a multi-depth-interval refocusing method, apparatus and electronic device.

BACKGROUND

Refocusing refers to reselecting a focal plane or a depth-of-field of a picture according to a user need after the picture is formed. When watching the picture, a viewer may select a scenery of interest to make the scenery clear, without having to passively watch a themed scenery selected by a photographer.

According to a refocusing method in the prior art, refocusing can be performed only on a single depth plane. In this manner, only one area corresponding to one depth plane can be selected at a time. However, in an actual application, a user may need to perform refocusing on multiple depth planes or one or more depth intervals, and the existing refocusing method cannot meet the user need. Even adding buttons or setting a multi-level menu cannot well resolve this problem, only to add memory load of the user. Therefore, a multi-depth-interval refocusing method urgently needs to be proposed.

SUMMARY

Embodiments of the present disclosure provide a multi-depth-interval refocusing method, apparatus and electronic device, which are used to implement multi-depth-interval refocusing.

According to a first aspect, an embodiment of the present disclosure provides a multi-depth-interval refocusing method, including displaying an image on a display device; acquiring user input, and determining, in the displayed image according to the user input, a refocus area including at least two discontinuous depth intervals, where each depth interval in the at least two discontinuous depth intervals is constituted by at least one depth plane, each depth plane contains at least one focus pixel, and depths of object points corresponding to focus pixels contained on a same depth plane are the same; performing refocusing processing on an image within the refocus area to display a refocused image on the display device, where the refocused image has a visually distinguishable definition difference relative to an area, except the refocus area, in the displayed image; and displaying the refocused image on the display device.

In a first possible implementation manner of the first aspect, the displaying an image on a display device includes displaying, on the display device, an image focused on any depth plane; or displaying, on the display device, an image focused within any depth interval.

In a second possible implementation manner of the first aspect, the acquiring user input, and determining, in the displayed image according to the user input, a refocus area including at least two discontinuous depth intervals includes acquiring input of at least two times of single-point sliding performed on a touchscreen by a user, determining at least two discontinuous depth intervals corresponding to the at least two times of single-point sliding, and determining the at least two discontinuous depth intervals as the refocus area, where each time of single-point sliding corresponds to one depth interval; or acquiring at least two times of divergent multipoint sliding performed on a touchscreen by a user using multiple fingers, constructing a closed graphic area using, as a vertex or a side, a position in which each finger is located when each time of sliding stops, determining at least two discontinuous depth intervals corresponding to at least two graphic areas constructed by performing the at least two times of divergent multipoint sliding using the multiple fingers, and determining the at least two discontinuous depth intervals as the refocus area, where each closed graphic area corresponds to one depth interval; or acquiring a trail or a closed geometric graphic, where the trail or the closed geometric graphic is drawn by a user using multiple fingers to perform multipoint sliding on a touchscreen or using a single finger to perform single-point sliding on a touchscreen, moving the trail or the closed geometric graphic to another position of the displayed image, determining at least two discontinuous depth intervals corresponding to an original position and the moved-to position of the trail or the closed geometric graphic, and determining the at least two discontinuous depth intervals as the refocus area, where each trail or each closed geometric graphic corresponds to one depth interval; or acquiring at least two times of single-point tapping performed on a touchscreen by a user, so as to select at least two points, and determining, as the refocus area according to one or more predefined depth interval values, at least two discontinuous depth intervals containing the points, where each of the points corresponds to one depth interval.

In a third possible implementation manner of the first aspect, the acquiring user input, and determining, in the displayed image according to the user input, a refocus area including at least two discontinuous depth intervals includes displaying a corresponding graphic object on the display device when a user touches and holds a physical button or a graphic button, detecting a posture operation performed on a device by the user, marking, using the graphic object, a path that the posture operation passes, using the path, marked using the graphic object, to obtain the refocus area, and when the user touches and holds the physical button or the graphic button again, repeating the foregoing actions to select a next refocus area; or displaying the graphic object on the display device, where the graphic object performs a corresponding physical motion along with the posture operation performed on a device by the user, using a current position of the graphic object to obtain the refocus area when the user triggers a physical button or a graphic button, and repeating, by the user, the foregoing actions to select a next refocus area; where the detecting a posture operation performed on a device by the user includes acquiring a translation operation performed on the device by the user, mapping a translation distance of the device to a spatial position of a scenario in the displayed image, and refocusing the scenario in the spatial position; or acquiring a tilting operation performed on the device by the user, mapping a tilt angle of the device to a spatial position of a scenario in the displayed image, and refocusing the scenario in the spatial position.

In a fourth possible implementation manner of the first aspect, the acquiring user input, and determining, in the displayed image according to the user input, a refocus area including at least two discontinuous depth intervals includes displaying a graphic object on the display device, tracing a trail on which a hand of a user moves, moving the graphic object along the trail that is obtained by means of tracing and on which the hand of the user moves, determining the at least two discontinuous depth intervals in an area in the displayed image, where the area is covered by the movement trail of the graphic object, and determining the at least two discontinuous depth intervals as the refocus area; or monitoring an action that a user pushes a palm, mapping, to a spatial position in the displayed image, a motion path of the action of pushing the palm, determining the at least two discontinuous depth intervals in the spatial position in the displayed image, where the spatial position is obtained by means of mapping, and determining the at least two discontinuous depth intervals as the refocus area.

With reference to the first aspect to the fourth possible implementation manner of the first aspect, in a fifth possible implementation manner of the first aspect, after the determining, in the displayed image according to the user input, a refocus area including at least two discontinuous depth intervals, and before the performing refocusing processing on an image within the refocus area to display a refocused image on the display device, the method further includes determining refocusing information of the refocus area; and correspondingly, the performing refocusing processing on an image within the refocus area to display a refocused image on the display device includes performing, based on the refocusing information, the refocusing processing on the image within the refocus area, so as to obtain the refocused image by means of synthesis, and displaying the refocused image on the display device.

With reference to the fifth possible implementation manner of the first aspect, in a sixth possible implementation manner of the first aspect, after the acquiring user input, the method further includes generating, according to the user input, a graphic object used for identifying the refocus area selected by the user, and performing displaying the graphic object, where the graphic object includes a point, a line, a circle, an oval, or a polygon; and correspondingly, the determining refocusing information of the refocus area includes, if the graphic object is a point, using, as the refocusing information according to a predefined depth interval value, information about a depth interval containing the point and/or information about a pixel interval containing the point; or if the graphic object is a line, using, as the refocusing information, depth interval information corresponding to the line and/or pixel interval information corresponding to the line; or if the graphic object is a circle, using, as the refocusing information, depth interval information corresponding to an area contained by the circle and/or pixel interval information corresponding to an area contained by the circle; or if the graphic object is an oval, using, as the refocusing information, depth interval information corresponding to an area contained by the oval and/or pixel interval information corresponding to an area contained by the oval; or if the graphic object is a polygon, using, as the refocusing information, depth interval information corresponding to an area contained by the polygon and/or pixel interval information corresponding to an area contained by the polygon.

With reference to the first aspect to the sixth possible implementation manner of the first aspect, in a seventh possible implementation manner of the first aspect, after the acquiring user input, the method further includes determining display information according to the user input, where the display information includes a divergence center and/or a display order of the refocused image; and correspondingly, the displaying the refocused image on the display device includes displaying, starting from the divergence center and from inside to outside or from outside to inside, the refocused images on the display device; or displaying the refocused images on the display device sequentially according to the display order, or interactively, or simultaneously.

With reference to the fifth possible implementation manner of the first aspect, in an eight possible implementation manner of the first aspect, the determining refocusing information of the refocus area includes calculating depth interval information and/or pixel interval information of a scenery in each refocus area, and using the depth interval information and/or the pixel interval information as the refocusing information, where the depth interval information includes at least one depth plane, and the pixel interval information includes any one or several types of the following information: pixel coordinate information, intensity information, color information, and focusing information.

In a ninth possible implementation manner of the first aspect, the determining refocusing information of the refocus area includes matching the user input in a user input case set, and determining, in the displayed image according to the user input, depth interval information and/or pixel interval information as the refocusing information, where the depth interval information and/or pixel interval information corresponds to the user input.

With reference to the sixth or seventh possible implementation manner of the first aspect, in a tenth possible implementation manner of the first aspect, after the determining refocusing information of the refocus area, the method further includes displaying the corresponding depth interval information, the corresponding pixel interval information, and corresponding depth-of-field information on the display device.

With reference to the fifth possible implementation manner of the first aspect, in an eleventh possible implementation manner of the first aspect, the performing, based on the refocusing information, the refocusing processing on the image within the refocus area, so as to obtain the refocused image by means of synthesis includes processing, based on the refocusing information, data corresponding to the displayed image, so as to obtain, by means of synthesis, one image in which refocusing is simultaneously performed on multiple depth planes or multiple images in which refocusing is simultaneously performed on multiple depth planes; and correspondingly, the displaying the refocused image on the display device includes displaying the one image in which refocusing is simultaneously performed on the multiple depth planes or the multiple images in which refocusing is simultaneously performed on the multiple depth planes.

With reference to the sixth possible implementation manner of the first aspect, in a twelfth possible implementation manner of the first aspect, the displaying the refocused image on the display device includes displaying all the refocused images sequentially according to a preset sequence starting from a refocused image corresponding to the divergence center of the refocus area.

With reference to the sixth possible implementation manner of the first aspect, in a thirteenth possible implementation manner of the first aspect, the displaying the refocused image on the display device includes displaying the refocused image according to predefined information, where the predefined information includes a predefined divergence center, a display order, and the displayed graphic object.

According to a second aspect, an embodiment of the present disclosure provides a multi-depth-interval refocusing apparatus, including a display module configured to display an image on a display device; a processing module configured to acquire user input, and determine, in the displayed image according to the user input, a refocus area including at least two discontinuous depth intervals, where each depth interval in the at least two discontinuous depth intervals is constituted by at least one depth plane, each depth plane contains at least one focus pixel, and depths of object points corresponding to focus pixels contained on a same depth plane are the same, where the processing module is further configured to perform refocusing processing on an image within the refocus area to display a refocused image on the display device, where the refocused image has a visually distinguishable definition difference relative to an area, except the refocus area, in the displayed image; and the display module is further configured to display the refocused image on the display device.

In a first possible implementation manner of the second aspect, the display module is configured to display, on the display device, an image focused on any depth plane; or display, on the display device, an image focused within any depth interval.

In a second possible implementation manner of the second aspect, the processing module is configured to acquire input of at least two times of single-point sliding performed on a touchscreen by a user, determine at least two discontinuous depth intervals corresponding to the at least two times of single-point sliding, and determine the at least two discontinuous depth intervals as the refocus area, where each time of single-point sliding corresponds to one depth interval; or acquire at least two times of divergent multipoint sliding performed on a touchscreen by a user using multiple fingers, construct a closed graphic area using, as a vertex or a side, a position in which each finger is located when each time of sliding stops, determine at least two discontinuous depth intervals corresponding to at least two graphic areas constructed by performing the at least two times of divergent multipoint sliding using the multiple fingers, and determine the at least two discontinuous depth intervals as the refocus area, where each closed graphic area corresponds to one depth interval; or acquire a trail or a closed geometric graphic, where the trail or the closed geometric graphic is drawn by a user using multiple fingers to perform multipoint sliding on a touchscreen or using a single finger to perform single-point sliding on a touchscreen, move the trail or the closed geometric graphic to another position of the displayed image, determine at least two discontinuous depth intervals corresponding to an original position and the moved-to position of the trail or the closed geometric graphic, and determine the at least two discontinuous depth intervals as the refocus area, where each trail or each closed geometric graphic corresponds to one depth interval; or acquire at least two times of single-point tapping performed on a touchscreen by a user, so as to select at least two points, and determine, as the refocus area according to one or more predefined depth interval values, at least two discontinuous depth intervals containing the points, where each of the points corresponds to one depth interval.

In a third possible implementation manner of the second aspect, the processing module includes a posture sensor unit configured to display a corresponding graphic object on the display device when a user touches and holds a physical button or a graphic button, detect a posture operation performed on a device by the user, mark, using the graphic object, a path that the posture operation passes, use the path, marked using the graphic object, as the refocus area, and when the user touches and holds the physical button or the graphic button again, repeat the foregoing actions to select a next refocus area; or display the graphic object on the display device, where the graphic object performs a corresponding physical motion along with the posture operation performed on a device by the user, and use a current position of the graphic object as the refocus area when the user triggers a physical button or a graphic button, where the user repeats the foregoing actions to select a next refocus area; where the posture sensor unit is configured to acquire a translation operation performed on the device by the user, map a translation distance of the device to a spatial position of a scenario in the displayed image, and refocus the scenario in the spatial position; or acquire a tilting operation performed on the device by the user, map a tilt angle of the device to a spatial position of a scenario in the displayed image, and refocus the scenario in the spatial position.

In a fourth possible implementation manner of the second aspect, the processing module includes an action tracking unit configured to display a graphic object on the display device, trace a trail on which a hand of a user moves, move the graphic object along the trail that is obtained by means of tracing and on which the hand of the user moves, determine at least two discontinuous depth intervals in an area in the displayed image, where the area is covered by the movement trail of the graphic object, and determine the at least two discontinuous depth intervals as the refocus area; or monitor an action that a user pushes a palm, map, to a spatial position in the displayed image, a motion path of the action of pushing the palm, determine at least two discontinuous depth intervals in the spatial position in the displayed image, where the spatial position is obtained by means of mapping, and determine the at least two discontinuous depth intervals as the refocus area.

With reference to the second aspect to the fourth possible implementation manner of the second aspect, in a fifth possible implementation manner of the second aspect, the processing module is further configured to determine refocusing information of the refocus area; and perform, based on the refocusing information, the refocusing processing on the image within the refocus area, so as to obtain the refocused image by means of synthesis, where the display module is further configured to display the refocused image on the display device.

With reference to the fifth possible implementation manner of the second aspect, in a sixth possible implementation manner of the second aspect, the processing module is further configured to generate, according to the user input, a graphic object used for identifying the refocus area selected by the user, and perform displaying the graphic object, where the graphic object includes a point, a line, a circle, an oval, or a polygon; and the processing module is configured to, if the graphic object is a point, use, as the refocusing information according to a predefined depth interval value, information about a depth interval containing the point and/or information about a pixel interval containing the point; or if the graphic object is a line, use, as the refocusing information, depth interval information corresponding to the line and/or pixel interval information corresponding to the line; or if the graphic object is a circle, use, as the refocusing information, depth interval information corresponding to an area contained by the circle and/or pixel interval information corresponding to an area contained by the circle; or if the graphic object is an oval, use, as the refocusing information, depth interval information corresponding to an area contained by the oval and/or pixel interval information corresponding to an area contained by the oval; or if the graphic object is a polygon, use, as the refocusing information, depth interval information corresponding to an area contained by the polygon and/or pixel interval information corresponding to an area contained by the polygon.

With reference to the second aspect to the sixth possible implementation manner of the second aspect, in a seventh possible implementation manner of the second aspect, the processing module is further configured to determine display information according to the user input, where the display information includes a divergence center and/or a display order of the refocused image; and the display module is configured to display, starting from the divergence center and from inside to outside or from outside to inside, the refocused images on the display device; or display the refocused images on the display device sequentially according to the display order, or interactively, or simultaneously.

With reference to the fourth possible implementation manner of the second aspect, in an eighth possible implementation manner of the second aspect, the processing module further includes a calculation unit configured to calculate depth interval information and/or pixel interval information of a scenery in each refocus area, and use the depth interval information and/or the pixel interval information as the refocusing information, where the depth interval information includes at least one depth plane, and the pixel interval information includes any one or several types of the following information: pixel coordinate information, intensity information, color information, and focusing information.

In a ninth possible implementation manner of the second aspect, the processing module is further configured to match the user input in a user input case set, and determine, in the displayed image according to the user input, depth interval information and/or pixel interval information as the refocusing information, where the depth interval information and/or pixel interval information corresponds to the user input.

With reference to the fifth or sixth possible implementation manner of the second aspect, in a tenth possible implementation manner of the second aspect, the display module is further configured to display the corresponding depth interval information, the corresponding pixel interval information, and corresponding depth-of-field information on the display device.

With reference to the fourth possible implementation manner of the second aspect, in an eleventh possible implementation manner of the second aspect, the processing module is configured to process, based on the refocusing information, data corresponding to the displayed image, so as to obtain, by means of synthesis, one image in which refocusing is simultaneously performed on multiple depth planes or multiple images in which refocusing is simultaneously performed on multiple depth planes; and correspondingly, the display module is configured to display the one image in which refocusing is simultaneously performed on the multiple depth planes or the multiple images in which refocusing is simultaneously performed on the multiple depth planes.

With reference to the fourth possible implementation manner of the second aspect, in a twelfth possible implementation manner of the second aspect, the display module is configured to display all the refocused images sequentially according to a preset sequence starting from a refocused image corresponding to the divergence center of the refocus area.

With reference to the fourth possible implementation manner of the second aspect, in a thirteenth possible implementation manner of the second aspect, the display module is configured to display the refocused image according to predefined information, where the predefined information includes a predefined divergence center, a display order, and the displayed graphic object.

According to a third aspect, an embodiment of the present disclosure provides an electronic device, including at least one processor, a memory controller, a peripheral equipment interface, and an input/output system, where the input/output system is connected to at least a display device and a user input device, and the electronic device further includes any of the foregoing multi-depth-interval refocusing apparatuses.

In a first possible implementation manner of the third aspect, the user input device is a touchscreen, a touchpad, a posture sensor, and/or an action tracking module.

In a second possible implementation manner of the third aspect, the display device is configured to display an image and a graphic object before refocusing interaction or in a refocusing process.

According to the multi-depth-interval refocusing method, apparatus and electronic device that are provided in the embodiments of the present disclosure, user input is acquired, and a refocus area including at least two discontinuous depth intervals is determined in a displayed image according to the user input; and refocusing processing is performed on an image within the refocus area to display a refocused image on the display device, where the refocused image has a visually distinguishable definition difference relative to an area, except the refocus area, in the displayed image, thereby implementing multi-depth-interval refocusing.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

A multi-depth-interval refocusing method provided in the embodiments of the present disclosure may be applied to the following scenario: for a device with an imaging module, where a display module of the device displays a scenario image in real time, a user performs interactive shooting control over the device using the multi-depth-interval refocusing method provided in the embodiments of the present disclosure; or for a device, such as a projector, that receives or stores re-focusable data, a user performs, using the multi-depth-interval refocusing method provided in the embodiments of the present disclosure, interactive browsing on an image displayed on a display module of the device. The image mentioned in the embodiments of the present disclosure may include an image constituted by original light-field data acquired by a light-field camera, may be an image that is refocused in any depth after calculation processing is performed, may be an image in a full depth, or may be a virtual image obtained by a computer performing synthesis.

Figure 1:
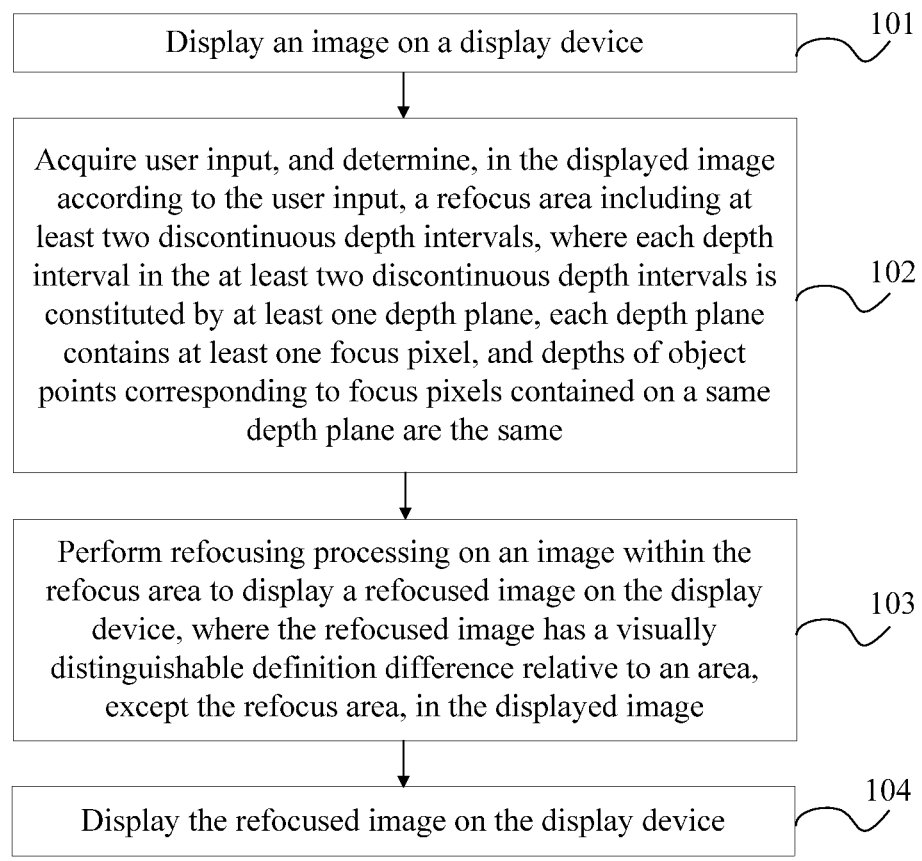
FIG. 1 is a flowchart of Embodiment 1 of a multi-depth-interval refocusing method according to embodiments of the present disclosure.

FIG. 1 is a flowchart of Embodiment 1 of a multi-depth-interval refocusing method according to embodiments of the present disclosure. The method in this embodiment is executed by a multi-depth-interval refocusing apparatus, where the apparatus is generally implemented by hardware and/or software and may be configured in an electronic device. As shown in FIG. 1, the multi-depth-interval refocusing method provided in this embodiment may include the following steps.

Step 101: Display an image on a display device.

The displayed image may be an image focused on a depth plane, or may be a fully focused image, where the depth refers to a distance between a scenery and an imaging plane of an imaging element in a camera. It should be noted that the displayed image may be an image resulted from processing, using a specific algorithm, data collected by a light-field camera. There is a microlens array between a main lens and an image sensor of the light-field camera, where each micro lens forms one element image that is recorded by the image sensor, and multiple element images constitute an image array.

The displaying an image on a display device may include displaying, on the display device, an image focused on any depth plane; or displaying, on the display device, an image focused within any depth interval.

Step 102: Acquire user input, and determine, in the displayed image according to the user input, a refocus area including at least two discontinuous depth intervals, where each depth interval in the at least two discontinuous depth intervals is constituted by at least one depth plane, each depth plane contains at least one focus pixel, and depths of object points corresponding to focus pixels contained on a same depth plane are the same.

The user input may be an operation of interaction between a user and the displayed image, or may be a user-defined input method, for example, inputting a command, and no limitation is imposed thereto in this embodiment. The foregoing operation of interaction between the user and the displayed image may be input of single-point tapping, multiple-point tapping, single-point sliding, or multipoint sliding performed on a touchscreen by the user. The multi-depth-interval refocusing apparatus may determine, in the displayed image according to the user input, the refocus area including the at least two discontinuous depth intervals.

Step 103: Perform refocusing processing on an image within the refocus area to display a refocused image on the display device, where the refocused image has a visually distinguishable definition difference relative to an area, except the refocus area, in the displayed image.

Refocusing information may be depth interval information, or may be pixel interval information, or may include both depth interval information and pixel interval information. The depth interval information contains at least one depth plane, and a depth interval may be constituted by one or more continuous depth planes; the pixel interval information includes any one or several types of the following information: pixel coordinate information, intensity information, color information, and focusing information.

After acquiring the input of the single-point tapping, the multiple-point tapping, the single-point sliding, or the multipoint sliding performed on the touchscreen by the user, the multi-depth-interval refocusing apparatus may process, according to focus pixel coordinates of the refocus area, original data corresponding to a focus pixel in the refocus area, so as to determine refocusing information of the refocus area, where the refocusing information may include a depth of an object point corresponding to the focus pixel in the refocus area, a parallax of the focus pixel in the refocus area, a point spread function for the focus pixel in the refocus area, a flare radius of the focus pixel in the refocus area, or coordinate information of the refocus area. It should be noted that, because types of to-be-processed images are different and implementation methods are different, required refocusing information is also different. The required refocusing information may be one type of the foregoing refocusing information, or may be any combination of the foregoing refocusing information.

Further, the refocused image obtained by means of synthesis may be obtained by performing a refocusing operation on the image, or may be obtained by performing a fusion splicing operation on the image, or may be obtained by performing both refocusing and fusion splicing operations on the image, and no limitation is imposed thereto in this embodiment.

Step 104: Display the refocused image on the display device.

The displayed refocused image may be an image displaying that all focus pixels within one refocus area are refocused simultaneously; or may be an image displaying that focus pixels within a refocus area are refocused sequentially from a divergence center to outside, where the divergence center of the displayed information is a starting point of the action; or may be refocused images that contain at least two depth intervals and that are displayed sequentially from near to far or from far to near in a sequence of a nearest depth, an intermediate depth, a farthest depth, and the like of the depth intervals.

According to the multi-depth-interval refocusing method provided in this embodiment, user input is acquired, and a refocus area including at least two discontinuous depth intervals is determined in a displayed image according to the user input; refocusing processing is performed on an image within the refocus area to display a refocused image on the display device, where the refocused image has a visually distinguishable definition difference relative to an area, except the refocus area, in the displayed image, thereby implementing multi-depth-interval refocusing.

Figure 2A:
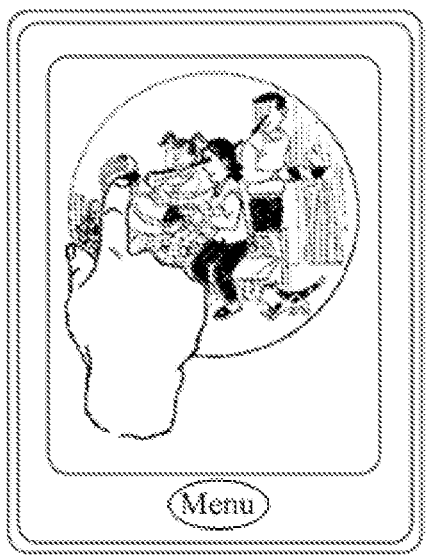
FIG. 2A is a schematic diagram of Embodiment 1 of a user gesture according to embodiments of the present disclosure.
Figure 2B:
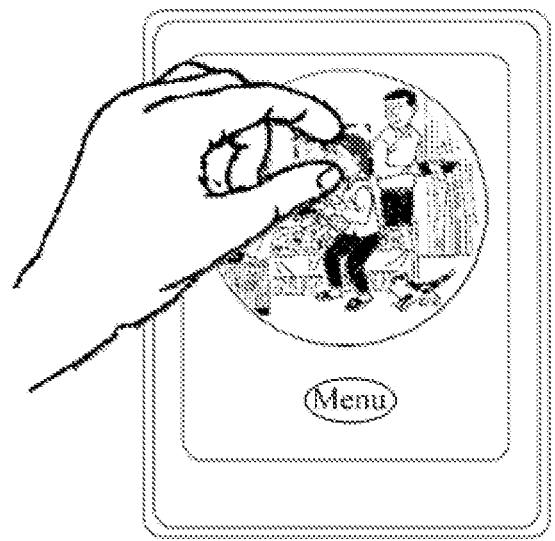
FIG. 2B is a schematic diagram of Embodiment 2 of a user gesture according to embodiments of the present disclosure.
Figure 2C:
FIG. 2C is a schematic diagram of Embodiment 3 of a user gesture according to embodiments of the present disclosure.
Figure 2D:
FIG. 2D is a schematic diagram of Embodiment 4 of a user gesture according to embodiments of the present disclosure.
Figure 2E:
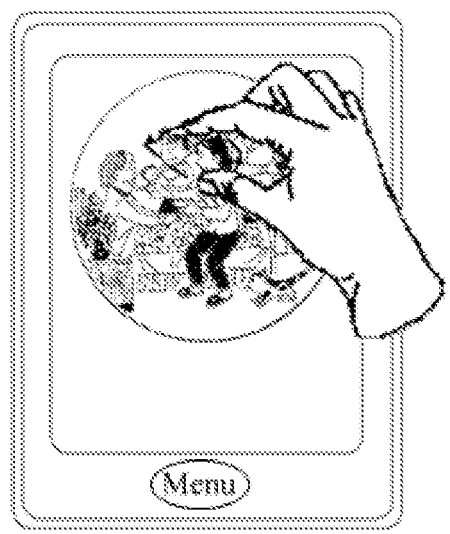
FIG. 2E is a schematic diagram of Embodiment 5 of a user gesture according to embodiments of the present disclosure.
Figure 2F:
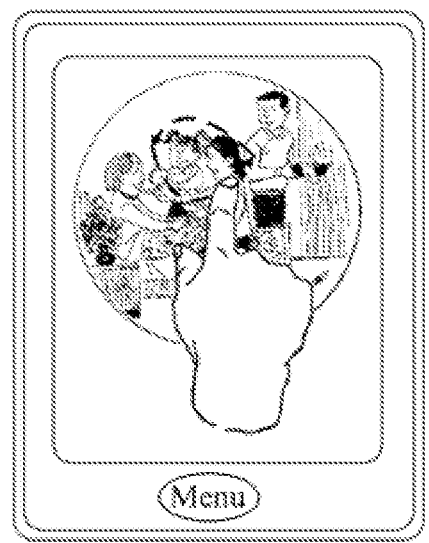
FIG. 2F is a schematic diagram of Embodiment 6 of a user gesture according to embodiments of the present disclosure.
Figure 2G:
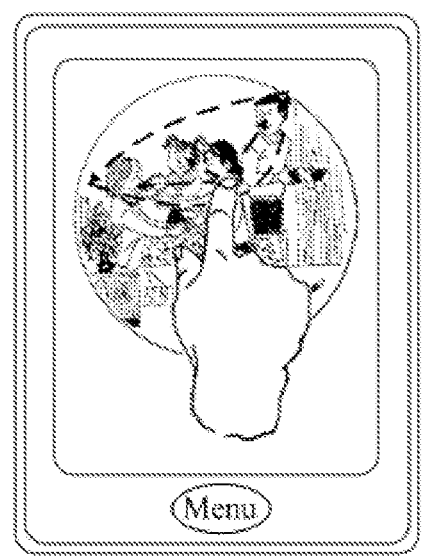
FIG. 2G is a schematic diagram of Embodiment 7 of a user gesture according to embodiments of the present disclosure.
Figure 2H:
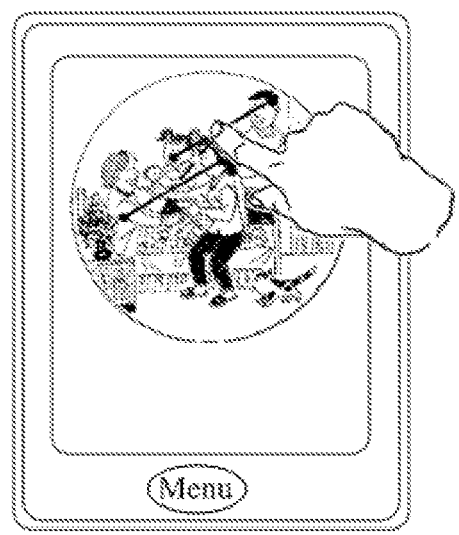
FIG. 2H is a schematic diagram of Embodiment 8 of a user gesture according to embodiments of the present disclosure.
Figure 2I:
FIG. 2I is a schematic diagram of Embodiment 9 of a user gesture according to embodiments of the present disclosure.

Based on the embodiment shown in FIG. 1, in this embodiment, step 102 may include acquiring, as shown in FIG. 2A, input of at least two times of single-point sliding performed on a touchscreen by a user, determining at least two discontinuous depth intervals corresponding to the at least two times of single-point sliding, and determining the at least two discontinuous depth intervals as the refocus area, where each time of single-point sliding corresponds to one depth interval; or acquiring at least two times of divergent multipoint sliding performed on a touchscreen by a user using multiple fingers, constructing, as shown in FIG. 2B, FIG. 2C, FIG. 2D, FIG. 2E, FIG. 2F, and FIG. 2G, a closed graphic area using, as a vertex or a side, a position in which each finger is located when each time of sliding stops, determining at least two discontinuous depth intervals corresponding to at least two graphic areas constructed by performing the at least two times of divergent multipoint sliding using the multiple fingers, and determining the at least two discontinuous depth intervals as the refocus area, where each closed graphic area corresponds to one depth interval; or acquiring a trail or a closed geometric graphic, where the trail or the closed geometric graphic is drawn by a user using multiple fingers to perform multipoint sliding on a touchscreen or using a single finger to perform single-point sliding on a touchscreen, moving, as shown in FIG. 2H, the trail or the closed geometric graphic to another position of the displayed image, determining at least two discontinuous depth intervals corresponding to an original position and the moved-to position of the trail or the closed geometric graphic, and determining the at least two discontinuous depth intervals as the refocus area, where each trail or each closed geometric graphic corresponds to one depth interval; or acquiring, as shown in FIG. 2I, at least two times of single-point tapping performed on a touchscreen by a user, so as to select at least two points, and determining, as the refocus area according to one or more predefined depth interval values, at least two discontinuous depth intervals containing the points, where each of the points corresponds to one depth interval.

In an actual application process, the user uses a single finger to perform, on the touchscreen, multiple times of single-point tapping sequentially or multiple times of single-point sliding sequentially, so as to select the refocus area containing the at least two discontinuous depth intervals, and a refocus area containing one depth interval is selected each time single-point tapping or single-point sliding is performed. Refocusing information may be a nearest depth plane and a farthest depth plane in each depth interval and a sequence in which all depth intervals are selected. When the user performs single-point tapping or single-point sliding for the first time, refocusing is performed within a first selected depth interval. When the user performs single-point tapping or single-point sliding for the second time, refocusing is performed within a second selected depth interval, and the first depth interval remains in a refocused state. When the user performs multiple times of single-point tapping or multiple times of single-point sliding, an image in which refocusing is performed within at least two depth intervals is always displayed on the display device; or after all tapping or sliding actions performed by the user stop, an image in which refocusing is simultaneously performed within all selected depth intervals may be displayed; or refocusing is performed within selected depth intervals sequentially according to a selection order, and finally, a refocused image containing at least two depth intervals is formed; or refocusing is performed within selected depth intervals sequentially from near to far or from far to near according to a depth of a depth interval, and finally, a refocused image containing at least two discontinuous depth intervals is formed.

The user simultaneously performs multipoint tapping or multipoint sliding on the touchscreen using multiple fingers, so as to select the refocus area containing the at least two discontinuous depth intervals. Each finger selects a refocus area containing one depth interval, and sliding directions of fingers may be the same, or may be different. Multiple refocus areas may be partially or fully overlapped or may be not overlapped. Refocusing information may be a nearest depth plane and a farthest depth plane in each depth interval and a sequence in which all depth intervals are selected. During displaying, an image in which refocusing is simultaneously performed within all selected depth intervals may be displayed; or refocusing is performed within selected depth intervals sequentially according to a selection order, and finally, a refocused image containing at least two depth intervals is formed; or refocusing is performed within selected depth intervals sequentially from near to far or from far to near according to a depth of a depth interval, and finally, a refocused image containing at least two discontinuous depth intervals is formed.

When the user performs multiple times of divergent multipoint sliding using multiple fingers, one closed geometric graphic area, for example, a circular area or a polygonal area, may be selected using each finger as a vertex or a side of the graphic each time. The closed geometric graphic area corresponds to one depth interval. By repeating the foregoing actions, the user may select the refocus area containing the at least two discontinuous depth intervals. Refocusing information may be a nearest depth plane and a farthest depth plane in each depth interval, a geometric center, a centroid, and a boundary of each closed geometric graphic, and a sequence in which all depth intervals are selected. When the user performs divergent multipoint sliding using multiple fingers for the first time, refocusing is performed within a first selected depth interval, and when the user performs divergent multipoint sliding within multiple fingers for the second time, refocusing is performed within a second selected depth interval, and the first depth interval remains in a refocused state. When the user performs multiple times of divergent multipoint sliding using multiple fingers, an image in which refocusing is performed within at least two discontinuous depth intervals is always displayed on a display screen; or after the user performs all divergent multipoint sliding using multiple fingers, an image in which refocusing is simultaneously performed within all selected depth intervals may be displayed; or refocusing is performed within selected depth intervals sequentially according to a selection order, and finally, a refocused image containing at least two discontinuous depth intervals is formed; or refocusing is performed within selected depth intervals sequentially from near to far or from far to near according to a depth of a depth interval, and finally, a refocused image containing at least two discontinuous depth intervals is formed.

When the user performs multipoint sliding or single-point sliding using multiple fingers or a single finger, a trail may be drawn, or a closed geometric graphic may be drawn. Then, the trail or the closed geometric graphic is moved to another position in the image by performing single-point dragging using a single finger. The foregoing action may implement a refocusing operation on the trail or in an area included by the closed geometric graphic, where refocusing information may be any one of: a depth of a nearest depth plane, a depth of a farthest depth plane, a path of single-point dragging, and a centroid, a geometric center, and a boundary of the closed geometric graphic. When the user drags the trail or the closed geometric graphic, an image may be displayed after the dragging is complete, where the image is an image in which refocusing is performed simultaneously within all areas covered by a path along which the trail or the closed geometric graphic is dragged; or a refocused image containing at least two depth intervals may be displayed sequentially according to a dragging path during the dragging or after the dragging; or a refocused image containing at least two discontinuous depth intervals may be displayed sequentially from near to far or from far to near according to a depth order of the depth intervals after the dragging is complete.

The user selects one point by performing single-point tapping using a single finger, and then selects, according to a predefined depth interval value or a user-defined depth interval value, one depth interval containing the point. The user may select a refocus area including at least two discontinuous depth intervals by repeating the foregoing actions or in a manner of performing simultaneous tapping using multiple fingers, where the depth interval value may be a depth of a nearest depth plane of the depth interval and a depth of a farthest depth plane of the depth interval, and the point selected by the user by performing single-point tapping using a single finger may be located in any position in the depth interval, where refocusing information may be coordinates of the point selected by the user by performing single-point tapping.

Further, after the user input on the touchscreen is acquired, depth interval information corresponding to the user input or pixel interval information corresponding to the user input or both are matched with a user input case set and used as refocusing information. If the user input and the user input case set are not matched, no corresponding refocusing operation is performed, and the user is prompted by, for example, displaying a prompt text or using sound or vibration; or after a preset time interval expires, user input is monitored again, and the foregoing process is repeated, and no limitation is imposed thereto in this embodiment.

The user input may be an operation of interaction between the user and the displayed image, or may be a posture operation performed on the display device by the user, or a user action monitored by the display device, and after the user input is acquired, the acquired user input is matched with the user input case set, so as to obtain refocusing information. The depth interval information contains at least one depth plane, and a depth interval may be constituted by one or more continuous depth planes; the pixel interval information includes any one or several types of the following information: pixel coordinate information, intensity information, color information, and focusing information.

It should be noted that the refocus area may be all areas corresponding to depth intervals of a closed geometric graphic area, or may be only a subarea, contained by the closed geometric graphic, in an area corresponding to a depth interval selected in the closed geometric graphic area.

The touchscreen may be a multi-finger sensitive touchscreen, or may be a multi-finger sensitive touchpad connected to the display device, and no limitation is imposed thereto in this embodiment.

According to the multi-depth-interval refocusing method provided in this embodiment, when a multi-depth-interval refocusing apparatus detects a contact between a user finger and a touchscreen, a quantity of contacts and positions of the contacts are determined. Then, whether the user finger moves is detected. If the user finger does not move, refocusing information corresponding to a selected refocus area is calculated. If the user finger moves, a movement speed, a movement direction, a movement acceleration, and a movement path are detected and tracked, whether the movement ends is determined, and if the movement ends, refocusing information corresponding to a combination of the contacts and the movement or corresponding to a series of gestures is calculated, or if the movement does not end, detecting of the movement path continues until the movement ends. Finally, a refocusing operation or an image fusion splicing operation or both are performed on each image according to the calculated refocusing information obtained by means of calculation, and an image obtained by means of refocusing is displayed on the display device.

It should be noted that the user may select whether to use the refocusing mode. If the refocusing mode is used, the multi-depth-interval refocusing apparatus may perform a corresponding refocusing operation on the image according to user input, and if an action performed by the user does not belong to actions that can be identified by the multi-depth-interval refocusing apparatus, the multi-depth-interval refocusing apparatus prompts the user in a specific manner, for example, displaying a prompt text, using voice for prompting, or using vibration for prompting. If the refocusing mode is not used, an action performed by the user is ignored even if the action belongs to actions that can be identified by the multi-depth-interval refocusing apparatus, and the multi-depth-interval refocusing apparatus does not perform a refocusing operation on the image, without affecting normal use of another operation.

According to the multi-depth-interval refocusing method provided in this embodiment, interactive input is performed on a displayed image by a user; a refocus area is determined according to the user input, and then refocusing information is determined according to the refocus area; data corresponding to the displayed image is processed based on the refocusing information, so as to obtain a multi-depth-interval refocused image by means of synthesis, thereby implementing multi-depth-interval refocusing. In addition, the user may delimit a refocus area in a multipoint input manner, and select and display multiple depth intervals on which refocusing is simultaneously performed.

Based on the embodiment shown in FIG. 1, in this embodiment, step 102 may include displaying a corresponding graphic object on the display device when a user touches and holds a physical button or a graphic button, detecting a posture operation performed on a device by the user, marking, using the graphic object, a path that the posture operation passes, using the path, marked using the graphic object, to obtain the refocus area, and when the user touches and holds the physical button or the graphic button again, repeating the foregoing actions to select a next refocus area; or displaying the graphic object on the display device, where the graphic object performs a corresponding physical motion along with the posture operation performed on a device by the user, using a current position of the graphic object to obtain the refocus area when the user triggers a physical button or a graphic button, and repeating, by the user, the foregoing actions to select a next refocus area.

The detecting a posture operation performed on a device by the user includes acquiring a translation operation performed on the device by the user, mapping a translation distance of the device to a spatial position of a scenario in the displayed image, and refocusing the scenario in the spatial position; or acquiring a tilting operation performed on the device by the user, mapping a tilt angle of the device to a spatial position of a scenario in the displayed image, and refocusing the scenario in the spatial position.

A posture sensor may detect a direction, an azimuth, an acceleration, an angular acceleration, or any combination thereof of a device during an action of the device, such as rotation, deflection, or an axial motion, so as to reconstruct a currently-complete three dimensional (3D) posture of the device. For example, when the user rotates a device forwards or pulls a device close to the user, the posture sensor senses a current posture of the device and matches the current posture with a user input case set. If the current posture and the user input case set are matched, a refocused image of a scenario at close distance is correspondingly displayed. When the user rotates a device backwards or pushes a device away, the posture sensor senses a current posture of the device and matches the current posture with a user input case set. If the current posture and the user input case set are matched, a refocused image of a remote scenario is correspondingly displayed. If the current movement posture of the device and the user input case set are not matched, no corresponding refocusing operation is performed, and the user is prompted by, for example, displaying a prompt text or using sound or vibration; or after a preset time interval expires, a posture of a device is monitored again, and the foregoing process is repeated.

More specifically, when the user translates the device forward, a background or a foreground in the image is refocused; or when the user translates the device backwards, a foreground or a background in the image is refocused. Alternatively, when the user translates the device leftward, an object on a left side of the image or an object on a right side of the image is refocused; or when the user translates the device rightward, an object on a right side of the image or an object on a left side of the image is refocused. A distance for the leftward translation or the rightward translation of the device may be mapped to a spatial position of a scenario in the image according to a proportional relationship. The spatial position corresponds to at least two discontinuous depth intervals and includes X-Y coordinates and/or depth information.

Alternatively, the user tilts a device forwards, that is, an upper edge of the device is forward and a lower edge of the device is backward, and a foreground or a background in the image is refocused; or the user tilts a device backwards, that is, an upper edge of the device is backward and a lower edge of the device is forward, and a foreground or a background in the image is refocused. Alternatively, the user tilts a device leftwards, that is, a left edge of the device is forward and a right edge of the device is backward, and an object on a left side of the image or an object on a right side of the image is refocused; or the user tilts a device rightwards, that is, a right edge of the device is backward and a left edge of the device is backward, and an object on a right side of the image or an object on a left side of the image is refocused. Tilting may contain only rotation, or may contain both translation and rotation; a central axis of the rotation may be a virtual rotation axis passing through a mobile phone, or may be a virtual rotation axis outside a mobile phone. For example, a wrist joint of a user keeps still, a palm is upward, and the palm swings from side to side. A tilt angle of the device is mapped to a spatial position of a scenario in the image according to a proportional relationship. The spatial position corresponds to at least two discontinuous depth intervals and includes X-Y coordinates and/or depth information.

Alternatively, when the user touches and holds a physical button or a graphic button, a corresponding graphic object is displayed on the display device, and a position of the graphic object correspondingly changes with a posture of the device. For example, when the user touches and holds the button, a circular point is displayed on the display device. When the user manipulates the device to enable the posture of the device to change, the circular point simulates a corresponding physical motion, and marks, just like a paintbrush, a path using a graphic object such as a curve, so as to select a refocus area. Alternatively, a graphic object is displayed on the display device, where the graphic object performs a corresponding physical motion along with a posture change of a mobile device. Then, when the user triggers the physical or graphic button, an image area in a current position of the graphic object is selected as the refocus area. A change of the posture, including a translation distance and a rotation angle, of the device is mapped to a spatial position of a scenario in the image according to a proportional relationship, and the spatial position corresponds to at least two discontinuous depth intervals and includes X-Y coordinates and/or depth information.

If the user wants to form a section of continuous refocus area, a preset button supporting the function may be touched and held, and a device having a posture sensor is rotated or moved at the same time, so as to select the section of continuous refocus area, where the continuous refocus area contains at least two discontinuous depth intervals.

Further, the posture sensor may include a gyroscope, an accelerometer, a magnetometer, a gravity sensor, and the like. The foregoing gyroscope measures an angular velocity during deflection and tilting of the device; the foregoing accelerometer can measure a magnitude and a direction of an acceleration of a device; the foregoing magnetometer can measure intensity and a direction of a magnetic field; and the foregoing gravity sensor determines a horizontal direction by sensing magnitudes of component forces in gravitational and orthogonal directions of a weight. According to the multi-depth-interval refocusing method provided in this embodiment, a posture sensor detects a motion rate, a motion direction, an acceleration, an angular acceleration, a gravity acceleration, or any combination thereof, of a device in each direction, so as to acquire a current motion posture of the device, thereby determining a refocus area that contains at least two discontinuous depth intervals and that is selected by the user.

It can be learned from the above that, according to the multi-depth-interval refocusing method provided in this embodiment, a refocus area containing at least two discontinuous depth intervals is determined by detecting a posture operation performed on a device by a user, and then refocusing information is determined; and data corresponding to an image is processed, so as to obtain a refocused image by means of synthesis and display the refocused image, thereby implementing multi-depth-interval refocusing.

Based on the embodiment shown in FIG. 1, in this embodiment, step 102 may include displaying a graphic object on the display device, tracing a trail on which a hand of a user moves, moving the graphic object along the trail that is obtained by means of tracing and on which the hand of the user moves, determining the at least two discontinuous depth intervals in an area in the displayed image, where the area is covered by the movement trail of the graphic object, and determining the at least two discontinuous depth intervals as the refocus area; or monitoring an action that a user pushes a palm, mapping, to a spatial position in the displayed image, a motion path of the action of pushing the palm, determining the at least two discontinuous depth intervals in the spatial position in the displayed image, where the spatial position is obtained by means of mapping, and determining the at least two discontinuous depth intervals as the refocus area.

It should be noted that the graphic object is displayed on the display device, the trail on which the hand of the user moves in a specific spatial area is traced, the graphic object is moved along the trail that is obtained by means of tracing and on which the hand of the user moves, the at least two discontinuous depth intervals are determined in an area in the displayed area, where the area is covered by the movement trail of the graphic object, and the at least two discontinuous depth intervals are determined as the refocus area, where hand movement beyond the specific spatial area is deemed an invalid movement and does not change a position of the graphic object; or the action that a user pushes a palm in a specific spatial area is monitored, a motion path of the action of pushing the palm in the specific spatial area is mapped to a spatial position in the displayed image, the at least two discontinuous depth intervals are determined in the displayed image obtained by means of mapping, and the at least two discontinuous depth intervals are determined as the refocus area, where an action of pushing the palm in an area beyond the specific spatial area is deemed an invalid action, for which no mapping is performed.

An action tracking module may collect and track a current action of the user and match the collected user action with a user input case set, so as to determine at least one refocus area that is selected. If the user action and the user input case set are not matched, no corresponding refocusing operation is performed, and the user is prompted by, for example, displaying a prompt text or using sound or vibration; or after a preset time interval expires, a user action is monitored again, and the foregoing process is repeated.

In a feasible implementation manner, the action tracking module may be a camera, an infrared motion sensing device, or the like. The action tracking module may execute an operation or an instruction, where the operation or the instruction is related to collecting and tracking a user action. The user action may be a motion across space performed relative to the action tracking module by a user using a finger, a palm, an eyeball, or a head.

According to the multi-depth-interval refocusing method provided in this embodiment, an action tracking module monitors and identifies a user action; and if the user action can be identified, a corresponding refocusing operation is performed, or if the user action cannot be identified, after a preset time interval expires, a user action is monitored again, and the foregoing process is repeated.

For example, a graphic object is displayed on a display device, a user waves to a device, the graphic object tracks the waving action of the user and selects, like a paintbrush, an area that the graphic object passes as a refocus area. For example, if the user waves to form multiple closed circles, multiple closed circles are displayed on the display device and represent multiple selected refocus areas. For another example, if the user draws a trail using a hand, the graphic object tracks the action of the hand of the user and draws, like a paintbrush, a corresponding trail on a display screen, where an area that the trail passes is a refocus area. A motion path of the hand of the user is mapped to a spatial portion, including X-Y coordinates and/or depth information, of a scenario in an image according to a mathematical relationship.

Alternatively, if a user pushes a hand forwards, a foreground is refocused; if a user pushes a hand backwards, a background is refocused; if a user waves leftwards, an object on a left side is refocused; or if a user waves rightwards, an object on a right side is refocused. A motion path of the hand of the user is mapped to a spatial portion, including X-Y coordinates and/or depth information, of a scenario in an image according to a mathematical relationship.

It can be learned from the above that interactive input is performed on a displayed image by a user; a refocus area containing at least two discontinuous depth intervals is determined by detecting a user action, and then refocusing information is determined; data corresponding to an image is processed, so as to obtain a refocused image by means of synthesis and display the refocused image, thereby implementing multi-depth-interval refocusing.

Figure 3:
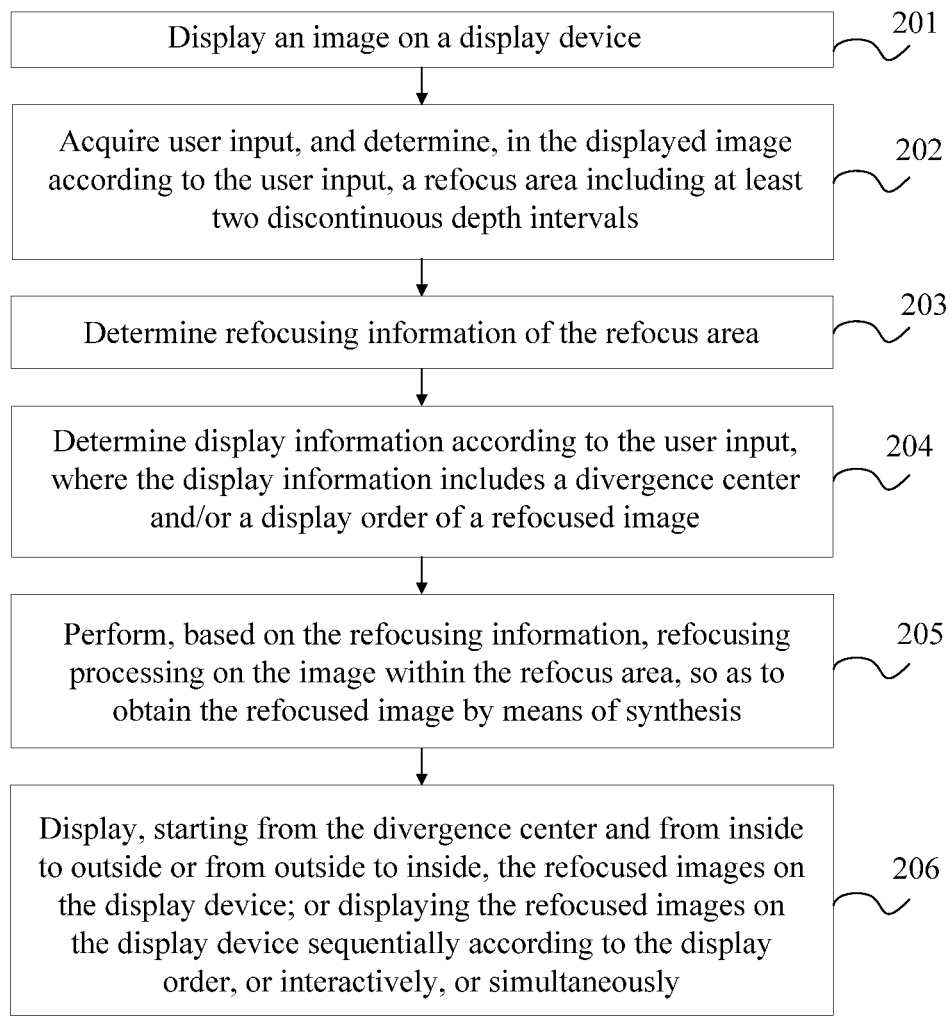
FIG. 3 is a flowchart of Embodiment 5 of a multi-depth-interval refocusing method according to embodiments of the present disclosure.

FIG. 3 is a flowchart of Embodiment 5 of a multi-depth-interval refocusing method according to embodiments of the present disclosure. The method in this embodiment is executed by a multi-depth-interval refocusing apparatus, where the apparatus is generally implemented by hardware and/or software and may be configured in an electronic device. As shown in FIG. 3, in the multi-depth-interval refocusing method provided in this embodiment, based on the embodiment shown in FIG. 1, the method provided in this embodiment may include the following steps.

Step 201: Display an image on a display device.

Step 202: Acquire user input, and determine, in the displayed image according to the user input, a refocus area including at least two discontinuous depth intervals.

In this step, a graphic object used for identifying the refocus area selected by a user may be generated according to the user input and is displayed, where the graphic object includes a point, a line, a circle, an oval, or a polygon.

Step 203: Determine refocusing information of the refocus area.

Corresponding to step 202, if the graphic object is a point, information about a depth interval containing the point or information about a pixel interval containing the point or both are used as the refocusing information according to a predefined depth interval value; or if the graphic object is a line, the depth interval information corresponding to the line or pixel interval information corresponding to the line or both are used as the refocusing information; or if the graphic object is a circle, the depth interval information corresponding to an area contained by the circle or pixel interval information corresponding to an area contained by the circle or both are used as the refocusing information; or if the graphic object is an oval, the depth interval information corresponding to an area contained by the oval or pixel interval information corresponding to an area contained by the oval or both are used as the refocusing information; or if the graphic object is a polygon, the depth interval information corresponding to an area contained by the polygon or pixel interval information corresponding to an area contained by the polygon or both are used as the refocusing information.

In this step, depth interval information and/or pixel interval information of a scenery in each refocus area may also be calculated and used as the refocusing information, where the depth interval information includes at least one depth plane, and the pixel interval information includes any one or several types of the following information: pixel coordinate information, intensity information, color information, and focusing information, and no limitation is imposed thereto in this embodiment.

Optionally, the corresponding depth interval information, the corresponding pixel interval information, and corresponding depth-of-field information may also be displayed on the display device.

Step 204: Determine display information according to the user input, where the display information includes a divergence center and/or a display order of a refocused image.

In this embodiment, a sequence of step 203 and step 204 is not limited. In an actual application process, step 204 may be executed first. That is, in this embodiment, the display information may be first determined according to the user input, and then the refocusing information is determined according to the user input; or the refocusing information may be first determined according to the user input, and then the display information is determined according to the user input, and no limitation is imposed thereto in this embodiment.

The divergence center may be a point in the area selected according to the user input, or may be a starting point of a trail, or may be a preset range of a point that is selected when a touchscreen is tapped. The divergence center may be optional, or may be predefined. The display order may be an order selected according to the user input, or may be a depth order of the depth planes, for example, from near to far or from far to near. The display order may be optional, and a predefined display order may be used as the display order.

Step 205: Perform, based on the refocusing information, refocusing processing on an image within the refocus area, so as to obtain the refocused image by means of synthesis.

In an actual application, data corresponding to the displayed image may be processed based on the refocusing information, so as to obtain, by means of synthesis, one image in which refocusing is simultaneously performed on multiple depth planes or multiple images in which refocusing is simultaneously performed on multiple depth planes; and correspondingly, the displaying the refocused image on the display device includes displaying the one image in which refocusing is simultaneously performed on the multiple depth planes or the multiple images in which refocusing is simultaneously performed on the multiple depth planes.

Step 206: Display, starting from the divergence center and from inside to outside or from outside to inside, the refocused images on the display device; or display the refocused images on the display device sequentially according to the display order, or interactively, or simultaneously.

When the display device displays the refocused image, all the refocused images may be displayed sequentially according to a preset sequence starting from a refocused image corresponding to the divergence center of the refocus area; or the refocused image is displayed according to predefined information, where the predefined information includes a predefined divergence center, a display order, and the displayed graphic object, and no limitation is imposed thereto in this embodiment.

According to the multi-depth-interval refocusing method provided in this embodiment, after user input is acquired, a divergence center or a display order or both are determined, such that a refocused image is displayed in a specific manner.

According to the multi-depth-interval refocusing method provided in this embodiment, interactive input is performed on a displayed image by a user; a refocus area containing at least two discontinuous depth intervals is determined according to user input, and then refocusing information and display information are determined; data corresponding to the image is processed, so as to obtain a refocused image by means of synthesis and display the refocused image, thereby implementing multi-depth-interval refocusing.

Figure 4:
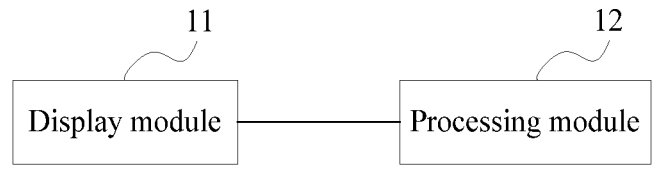
FIG. 4 is a simplified block diagram of Embodiment 1 of a multi-depth-interval refocusing apparatus according to embodiments of the present disclosure.

FIG. 4 is a simplified block diagram of Embodiment 1 of a multi-depth-interval refocusing apparatus according to embodiments of the present disclosure. As shown in FIG. 4, the multi-depth-interval refocusing apparatus provided in this embodiment may include a display module 11 and a processing module 12.

The display module 11 is configured to display an image and a refocused image on a display device.

The processing module 12 is configured to acquire user input, and determine, in the displayed image according to the user input, a refocus area including at least two discontinuous depth intervals, where each depth interval in the at least two discontinuous depth intervals is constituted by at least one depth plane, each depth plane contains at least one focus pixel, and depths of object points corresponding to focus pixels contained on a same depth plane are the same; or perform refocusing processing on an image within the refocus area to display a refocused image on the display device, where the refocused image has a visually distinguishable definition difference relative to an area, except the refocus area, in the displayed image.

The display module 11 is configured to display an image focused on any depth plane; or display an image focused within any depth interval. The displayed refocused image may be an image displaying that all focus pixels within a refocus area are simultaneously refocused; or may be an image displaying that focus pixels within a refocus area are refocused sequentially from a divergence center to outside, where a starting point of the action is the divergence center of the displayed information; or may be refocused images that contain at least two depth intervals and that are displayed sequentially within at least two depth intervals from near to far or from far to near in a sequence of a nearest depth, an intermediate depth, a farthest depth, and the like of the depth intervals.

The multi-depth-interval refocusing apparatus in this embodiment may be configured to execute technical solutions of the method embodiment shown in FIG. 1, an implementation principle and a technical effect of the multi-depth-interval refocusing apparatus are similar to those of the method embodiment, and details are not repeatedly described herein.

Based on the foregoing embodiment, in the multi-depth-interval refocusing apparatus provided in this embodiment, the processing module 12 may be further configured to acquire input of at least two times of single-point sliding performed on a touchscreen by a user, determine at least two discontinuous depth intervals corresponding to the at least two times of single-point sliding, and determine the at least two discontinuous depth intervals as the refocus area, where each time of single-point sliding corresponds to one depth interval; or acquire at least two times of divergent multipoint sliding performed on a touchscreen by a user using multiple fingers, construct a closed graphic area using, as a vertex or a side, a position in which each finger is located when each time of sliding stops, determine at least two discontinuous depth intervals corresponding to at least two graphic areas constructed by performing the at least two times of divergent multipoint sliding using the multiple fingers, and determine the at least two discontinuous depth intervals as the refocus area, where each closed graphic area corresponds to one depth interval; or acquire a trail or a closed geometric graphic, where the trail or the closed geometric graphic is drawn by a user using multiple fingers to perform multipoint sliding on a touchscreen or using a single finger to perform single-point sliding on a touchscreen, move the trail or the closed geometric graphic to another position of the displayed image, determine at least two discontinuous depth intervals corresponding to an original position and the moved-to position of the trail or the closed geometric graphic, and determine the at least two discontinuous depth intervals as the refocus area, where each trail or each closed geometric graphic corresponds to one depth interval; or acquire at least two times of single-point tapping performed on a touchscreen by a user, so as to select at least two points, and determine, as the refocus area according to one or more predefined depth interval values, at least two discontinuous depth intervals containing the points, where each of the points corresponds to one depth interval.

After acquiring the user input on the touchscreen, the processing module 12 matches, with a user input case set, depth interval information corresponding to the user input and/or pixel interval information corresponding to the user input, and uses the depth interval information and/or the pixel interval information as refocusing information. If the user input and the user input case set are not matched, no corresponding refocusing operation is performed, and the user is prompted by, for example, displaying a prompt text or using sound or vibration; or after a preset time interval expires, user input is monitored again, and the foregoing process is repeated, and no limitation is imposed thereto in this embodiment.

It should be noted that the user input acquired by the processing module 12 may be an operation of interaction between the user and the displayed image, or may be a posture operation performed on the display device by the user, or a user action monitored by the display device, and after the user input is acquired, the acquired user input is matched with the user input case set, so as to obtain refocusing information. The depth interval information contains at least one depth plane, and a depth interval may be constituted by one or more continuous depth planes; the pixel interval information includes any one or several types of the following information: pixel coordinate information, intensity information, color information, and focusing information.

It should be noted that the refocus area may be all areas corresponding to depth intervals of a closed geometric graphic area, or may be only a subarea, contained by the closed geometric graphic, in an area corresponding to a depth interval selected in the closed geometric graphic area.

The multi-depth-interval refocusing apparatus in this embodiment may be configured to execute technical solutions of the foregoing method embodiments. An implementation principle and a technical effect of the multi-depth-interval refocusing apparatus are similar to those of the foregoing method embodiments, and details are not repeatedly described herein.

Figure 5:
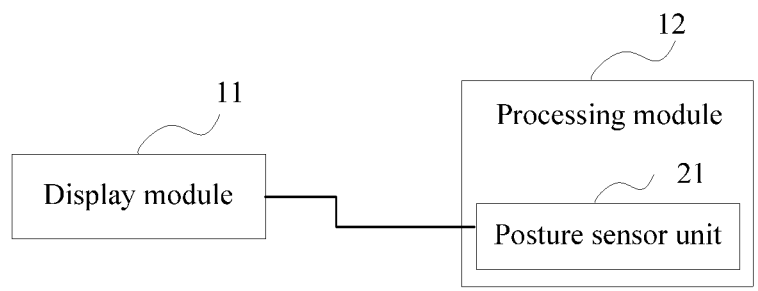
FIG. 5 is a simplified block diagram of Embodiment 2 of a multi-depth-interval refocusing apparatus according to embodiments of the present disclosure.

FIG. 5 is a simplified block diagram of Embodiment 2 of a multi-depth-interval refocusing apparatus according to embodiments of the present disclosure. As shown in FIG. 5, based on the foregoing embodiment, in the multi-depth-interval refocusing apparatus provided in this embodiment, the foregoing processing module 12 may further include a posture sensor unit 21 configured to display a corresponding graphic object on the display device when a user touches and holds a physical button or a graphic button, detect a posture operation performed on a device by the user, mark, using the graphic object, a path that the posture operation passes, and use the path, marked using the graphic object, as the refocus area, and when the user touches and holds the physical button or the graphic button again, repeat the foregoing actions to select a next refocus area; or display the graphic object on the display device, where the graphic object performs a corresponding physical motion along with the posture operation performed on a device by the user, and use a current position of the graphic object as the refocus area when the user triggers a physical button or a graphic button, where the user repeats the foregoing actions to select a next refocus area.

The posture sensor unit 21 is further configured to acquire a translation operation performed on the device by the user, map a translation distance of the device to a spatial position of a scenario in the displayed image, and refocus the scenario in the spatial position; or acquire a tilting operation performed on the device by the user, map a tilt angle of the device to a spatial position of a scenario in the displayed image, and refocus the scenario in the spatial position.

In an actual application process, the posture sensor unit 21 may detect a direction, an azimuth, an acceleration, an angular acceleration, or any combination thereof of a device during an action of the device, such as rotation, deflection, or an axial motion, so as to reconstruct a currently-complete 3D posture of the device. For example, when the user rotates a device forwards or pulls a device close to the user, the posture sensor unit 21 senses a current posture of the device and matches the current posture with a user input case set. If the current posture and the user input case set are matched, a refocused image of a scenario at close distance is correspondingly displayed. When the user rotates a device backwards or pushes a device away, the posture sensor unit 21 senses a current posture of the device and matches the current posture with a user input case set. If the current posture and the user input case set are matched, a refocused image of a remote scenario is correspondingly displayed. If the current movement posture of the device and the user input case set are not matched, no corresponding refocusing operation is performed, and the user is prompted by, for example, displaying a prompt text or using sound or vibration; or after a preset time interval expires, a posture of a device is monitored again, and the foregoing process is repeated.

The multi-depth-interval refocusing apparatus in this embodiment may be configured to execute technical solutions of the foregoing method embodiments. An implementation principle and a technical effect of the multi-depth-interval refocusing apparatus are similar to those of the foregoing method embodiments, and details are not repeatedly described herein.

Figure 6:
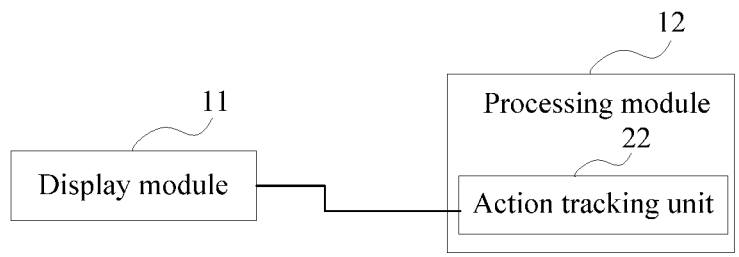
FIG. 6 is a simplified block diagram of Embodiment 3 of a multi-depth-interval refocusing apparatus according to embodiments of the present disclosure.

FIG. 6 is a simplified block diagram of Embodiment 3 of a multi-depth-interval refocusing apparatus according to embodiments of the present disclosure. As shown in FIG. 6, based on the foregoing embodiment, in the multi-depth-interval refocusing apparatus provided in this embodiment, the foregoing processing module 12 may further include an action tracking unit 22 configured to display a graphic object on the display device, trace a trail on which a hand of a user moves, move the graphic object along the trail that is obtained by means of tracing and on which the hand of the user moves, determine at least two discontinuous depth intervals in an area in the displayed image, where the area is covered by the movement trail of the graphic object, and determine the at least two discontinuous depth intervals as the refocus area; or monitor an action that a user pushes a palm, map, to a spatial position in the displayed image, a motion path of the action of pushing the palm, determine at least two discontinuous depth intervals in the spatial position in the displayed image, where the spatial position is obtained by means of mapping, and determine the at least two discontinuous depth intervals as the refocus area.

It should be noted that the graphic object is displayed on the display device, the trail on which the hand of the user moves in a specific spatial area is traced, the graphic object is moved along the trail that is obtained by means of tracing and on which the hand of the user moves, the at least two discontinuous depth intervals are determined in an area in the displayed image, where the area is covered by the movement trail of the graphic object, and the at least two discontinuous depth intervals are determined as the refocus area, where hand movement beyond the specific spatial area is deemed an invalid movement and does not change a position of the graphic object; or the action that a user pushes a palm in a specific spatial area is monitored, a motion path of the action of pushing the palm in the specific spatial area is mapped to a spatial position in the displayed image, the at least two discontinuous depth intervals are determined in the displayed image obtained by means of mapping, and the at least two discontinuous depth intervals are determined as the refocus area, where an action of pushing the palm in an area beyond the specific spatial area is deemed an invalid action, for which no mapping is performed.

The action tracking unit 22 may collect and track a current action of the user and match the collected user action with a user input case set, so as to determine at least one refocus area that is selected. If the user action and the user input case set are not matched, no corresponding refocusing operation is performed, and the user is prompted by, for example, displaying a prompt text or using sound or vibration; or after a preset time interval expires, a user action is monitored again, and the foregoing process is repeated.

In a feasible implementation manner, the action tracking unit 22 may be a camera, an infrared motion sensing device, or the like. The action tracking unit 22 may execute an operation or an instruction, where the operation or the instruction is related to collecting and tracking a user action. The user action may be a motion across space performed relative to the action tracking unit 22 by a user using a finger, a palm, an eyeball, or a head.

The multi-depth-interval refocusing apparatus in this embodiment may be configured to execute technical solutions of the foregoing method embodiments. An implementation principle and a technical effect of the multi-depth-interval refocusing apparatus are similar to those of the foregoing method embodiments, and details are not repeatedly described herein.

Figure 7:
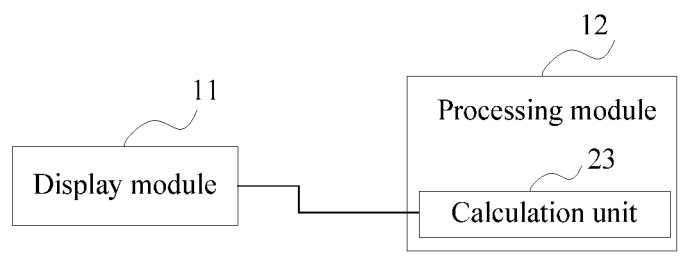
FIG. 7 is a simplified block diagram of Embodiment 4 of a multi-depth-interval refocusing apparatus according to embodiments of the present disclosure.

FIG. 7 is a simplified block diagram of Embodiment 4 of a multi-depth-interval refocusing apparatus according to embodiments of the present disclosure. As shown in FIG. 7, based on the foregoing embodiment, in the multi-depth-interval refocusing apparatus provided in this embodiment, the foregoing processing module 12 may further generate, according to the user input, a graphic object used for identifying the refocus area selected by a user, and perform displaying the graphic object, where the graphic object includes a point, a line, a circle, an oval, or a polygon.

If the graphic object is a point, the processing module 12 may use, as the refocusing information according to a predefined depth interval value, information about a depth interval containing the point and/or information about a pixel interval containing the point; or if the graphic object is a line, the processing module 12 may use, as the refocusing information, the depth interval information corresponding to the line and/or pixel interval information corresponding to the line; or if the graphic object is a circle, the processing module 12 may use, as the refocusing information, the depth interval information corresponding to an area contained by the circle and/or pixel interval information corresponding to an area contained by the circle; or if the graphic object is an oval, the processing module 12 may use, as the refocusing information, the depth interval information corresponding to an area contained by the oval and/or pixel interval information corresponding to an area contained by the oval; or if the graphic object is a polygon, the processing module 12 may use, as the refocusing information, the depth interval information corresponding to an area contained by the polygon and/or pixel interval information corresponding to an area contained by the polygon.

The processing module 12 may further include a calculation unit 23, where the calculation unit 23 is configured to calculate depth interval information and/or pixel interval information of a scenery in each refocus area, and use the depth interval information and/or the pixel interval information as the refocusing information, where the depth interval information includes at least one depth plane, and the pixel interval information includes any one or several types of the following information: pixel coordinate information, intensity information, color information, and focusing information.

The display module 11 may be further configured to display the corresponding depth interval information, the corresponding pixel interval information, and corresponding depth-of-field information.

The multi-depth-interval refocusing apparatus in this embodiment may be configured to execute technical solutions of the foregoing method embodiments. An implementation principle and a technical effect of the multi-depth-interval refocusing apparatus are similar to those of the foregoing method embodiments, and details are not repeatedly described herein.

An electronic device provided in this embodiment may include at least one processor, a memory controller, a peripheral equipment interface, and an input/output system, where the input/output system is connected to at least a display device and a user input device; and may further include the multi-depth-interval refocusing apparatus according to any one of the foregoing embodiments.

The user input device may be a touchscreen, a touchpad, a posture sensor, and/or an action tracking module; the foregoing display device may be configured to display an image and a graphic object before refocusing interaction or in a refocusing process.

The electronic device provided in this embodiment may be configured to execute the technical solutions of any embodiment. An implementation principle and a technical effect of the electronic device are similar to those of any embodiment, and details are not repeatedly described herein.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random access memory (RAM), a magnetic disc, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A multi-depth-interval refocusing method, comprising:
    displaying an image on a display device;
    acquiring user input, and determining, in the displayed image according to the user input, a refocus area comprising at least two discontinuous depth intervals, each depth interval in the at least two discontinuous depth intervals being constituted by at least one depth plane, each depth plane containing at least one focus pixel, depths of object points corresponding to focus pixels contained on a same depth plane being the same, acquiring the user input, and determining, in the displayed image according to the user input, the refocus area comprising at least two discontinuous depth intervals comprising at least one of:
        acquiring at least two times of divergent multipoint sliding performed on a touchscreen by a user using multiple fingers, constructing a closed graphic area using, as a vertex or a side, a position in which each finger is located when each time of sliding stops, determining at least two discontinuous depth intervals corresponding to at least two graphic areas constructed by performing the at least two times of divergent multipoint sliding using the multiple fingers, and determining the at least two discontinuous depth intervals as the refocus area, each closed graphic area corresponding to one depth interval; and
        acquiring a trail or a closed geometric graphic, the trail or the closed geometric graphic being drawn by the user using multiple fingers to perform multipoint sliding on a touchscreen or using a single finger to perform single-point sliding on a touchscreen, moving the trail or the closed geometric graphic to another position of the displayed image, determining at least two discontinuous depth intervals corresponding to an original position and a moved-to position of the trail or the closed geometric graphic, and determining the at least two discontinuous depth intervals as the refocus area, each trail or each closed geometric graphic corresponding to one depth interval;
    matching the user input in a user input case set;
    notifying the user in response to the user input not matching the user input case set;
    determining, in the displayed image according to the user input, depth interval information or pixel interval information as refocusing information in response to the user input matching the user input case set, the depth interval information or pixel interval information corresponding to the user input;
    performing, based on the refocusing information, refocusing processing on an image within the refocus area in order to obtain a refocused image by means of synthesis, the refocused image having a visually distinguishable definition difference relative to an area, except the refocus area, in the displayed image; and
    displaying the refocused image on the display device.

2. The method according to claim 1, wherein displaying the image on the display device comprises displaying, on the display device, at least one of:
    an image focused on any depth plane; and
    an image focused within any depth interval.

3. The method according to claim 1, wherein acquiring user input, and determining, in the displayed image according to the user input, the refocus area comprising at least two discontinuous depth intervals further comprises at least one of:
    displaying a corresponding graphic object on the display device when the user touches and holds a physical button or a graphic button, detecting a posture operation performed on a device by the user, marking, using the graphic object, a path that the posture operation passes, using the path, marked using the graphic object, to obtain the refocus area, and when the user touches and holds the physical button or the graphic button again, repeating the foregoing actions to select a next refocus area; and
    displaying a graphic object on the display device, the graphic object performing a corresponding physical motion along with a posture operation performed on a device by the user, using a current position of the graphic object to obtain the refocus area when the user triggers a physical button or a graphic button, and repeating, by the user, the foregoing actions to select a next refocus area,
    detecting the posture operation performed on the device by the user comprising at least one of:
        acquiring a translation operation performed on the device by the user, mapping a translation distance of the device to a spatial position of a scenario in the displayed image, and refocusing the scenario in the spatial position; and
        acquiring a tilting operation performed on the device by the user, mapping a tilt angle of the device to a spatial position of a scenario in the displayed image, and refocusing the scenario in the spatial position.

4. The method according to claim 1, wherein acquiring user input, and determining, in the displayed image according to the user input, the refocus area comprising at least two discontinuous depth intervals further comprises at least one of:
    displaying a graphic object on the display device, tracing a trail on which a hand of the user moves, moving the graphic object along the trail that is obtained by means of tracing and on which the hand of the user moves, determining the at least two discontinuous depth intervals in an area in the displayed image, the area being covered by the trail of the graphic object, and determining the at least two discontinuous depth intervals as the refocus area; and monitoring an action that the user pushes a palm, mapping, to a spatial position in the displayed image, a motion path of the action of pushing the palm, determining the at least two discontinuous depth intervals in the spatial position in the displayed image, the spatial position being obtained by means of mapping, and determining the at least two discontinuous depth intervals as the refocus area.

5. The method according to claim 1, wherein after acquiring the user input, the method further comprises generating, according to the user input, a graphic object used for identifying the refocus area selected by the user, and performing displaying the graphic object, the graphic object comprising a point, a line, a circle, an oval, or a polygon, and, correspondingly, determining refocusing information of the refocus area comprising:
when the graphic object is a point, using, as the refocusing information according to a predefined depth interval value, information about a depth interval containing the point or information about a pixel interval containing the point;
when the graphic object is a line, using, as the refocusing information, depth interval information corresponding to the line or pixel interval information corresponding to the line;
when the graphic object is a circle, using, as the refocusing information, depth interval information corresponding to an area contained by the circle or pixel interval information corresponding to an area contained by the circle;
when the graphic object is an oval, using, as the refocusing information, depth interval information corresponding to an area contained by the oval or pixel interval information corresponding to an area contained by the oval; and
when the graphic object is a polygon, using, as the refocusing information, depth interval information corresponding to an area contained by the polygon or pixel interval information corresponding to an area contained by the polygon.

6. The method according to claim 5, wherein after determining refocusing information of the refocus area, the method further comprises displaying corresponding depth interval information, corresponding pixel interval information, and corresponding depth-of-field information on the display device.

7. The method according to claim 5, wherein displaying the refocused image on the display device comprises displaying all refocused images sequentially according to a preset sequence starting from a refocused image corresponding to a divergence center of the refocus area.

8. The method according to claim 5, wherein displaying the refocused image on the display device comprises displaying the refocused image according to predefined information, the predefined information comprising a predefined divergence center, a display order, and the displayed graphic object.

9. The method according to claim 1, wherein after acquiring the user input, the method further comprises determining display information according to the user input, the display information comprising a divergence center or a display order of the refocused image, and, correspondingly, displaying the refocused image on the display device comprising displaying, starting from the divergence center and from inside to outside or from outside to inside, refocused images on the display device, or displaying refocused images on the display device sequentially according to the display order, or interactively, or simultaneously.

10. The method according to claim 1, wherein determining refocusing information of the refocus area comprises calculating depth interval information or pixel interval information of a scenery in each refocus area, and using the depth interval information or the pixel interval information as the refocusing information, the depth interval information comprising at least one depth plane, and the pixel interval information comprising at least one of pixel coordinate information, intensity information, color information, and focusing information, corresponding depth-of-field information on the display device.

11. The method according to claim 1, wherein performing, based on the refocusing information, the refocusing processing on the image within the refocus area, so as to obtain the refocused image by means of synthesis comprises processing, based on the refocusing information, data corresponding to the displayed image, so as to obtain, by means of synthesis, one image in which refocusing is simultaneously performed on multiple depth planes or multiple images in which refocusing is simultaneously performed on multiple depth planes, and, correspondingly, displaying the refocused image on the display device comprising displaying the one image in which refocusing is simultaneously performed on the multiple depth planes or the multiple images in which refocusing is simultaneously performed on the multiple depth planes.

12. The method according to claim 1, wherein notifying the user in response to the user input not matching the user input case set comprises notifying the user using sound, vibration, or displaying a prompt text on the display.

13. An electronic device, comprising:
at least one processor;
a memory controller;
a peripheral equipment interface; and
an input/output system,
the input/output system being connected to at least a display device and a user input device, the electronic device further comprising a multi-depth-interval refocusing apparatus, and the multi-depth-interval refocusing apparatus comprising:
a display configured to display an image on a display device; and
a processor configured to:
acquire user input, and determine, in the displayed image according to the user input, a refocus area comprising at least two discontinuous depth intervals, each depth interval in the at least two discontinuous depth intervals being constituted by at least one depth plane, each depth plane containing at least one focus pixel, depths of object points corresponding to focus pixels contained on a same depth plane being the same, acquiring the user input, and determining, in the displayed image according to the user input, the refocus area comprising at least two discontinuous depth intervals comprising at least one of:
acquiring at least two times of divergent multi-point sliding performed on a touchscreen by a user using multiple fingers, constructing a closed graphic area using, as a vertex or a side, a position in which each finger is located when each time of sliding stops, determining at least two discontinuous depth intervals corresponding to at least two graphic areas constructed by performing the at least two times of divergent multipoint sliding using the multiple fingers, and determining the at least two discontinuous depth intervals as the refocus area, each closed graphic area corresponding to one depth interval; and acquiring a trail or a closed geometric graphic, the trail or the closed geometric graphic being drawn by the user using multiple fingers to perform multipoint sliding on a touchscreen or using a single finger to perform single-point sliding on a touchscreen, moving the trail or the closed geometric graphic to another position of the displayed image, determining at least two discontinuous depth intervals corresponding to an original position and a moved-to position of the trail or the closed geometric graphic, and determining the at least two discontinuous depth intervals as the refocus area, each trail or each closed geometric graphic corresponding to one depth interval;

match the user input in a user input case set;

notify the user in response to the user input not matching the user input case set;

determine, in the displayed image according to the user input, depth interval information or pixel interval information as refocusing information in response to the user input matching the user input case set, the depth interval information or pixel interval information corresponding to the user input; and perform, based on the refocusing information, refocusing processing on an image within the refocus area in order to obtain a refocused image by means of synthesis, the refocused image having a visually distinguishable definition difference relative to an area, except the refocus area, in the displayed image, and the display being further configured to display the refocused image on the display device.

14. The electronic device according to claim 13, wherein the user input device is a touchscreen, a touchpad, a posture sensor, or an action tracking module.

15. The electronic device according to claim 14, wherein the display device is configured to display an image and a graphic object before refocusing interaction or in a refocusing process.

\* \* \* \* \*